(12) United States Patent
Rehrig

(10) Patent No.: US 7,081,586 B2
(45) Date of Patent: Jul. 25, 2006

(54) POWER CABLE ASSEMBLY FOR WATER AND AIR-COOLED WELDING TORCHES

(76) Inventor: Richard B. Rehrig, P. O. Box 1870, San Marcos, CA (US) 92079

( * ) Notice: Subject to any disclaimer, the term of this patent is extended or adjusted under 35 U.S.C. 154(b) by 0 days.

(21) Appl. No.: 10/618,005

(22) Filed: Jul. 11, 2003

(65) Prior Publication Data

US 2005/0006116 A1    Jan. 13, 2005

(51) Int. Cl.
*H01B 9/06* (2006.01)
*H01B 7/34* (2006.01)

(52) U.S. Cl. .................. 174/15.1; 174/15.6; 174/15.7

(58) Field of Classification Search ............. 174/15.1, 174/15.4, 15.5, 15.6, 19, 20, 74 R
See application file for complete search history.

(56) References Cited

U.S. PATENT DOCUMENTS

| | | | | |
|---|---|---|---|---|
| 3,801,724 A | * | 4/1974 | Goodman | 174/15.7 |
| 3,917,898 A | * | 11/1975 | Iketani et al. | 174/15.6 |
| 4,310,718 A | * | 1/1982 | Eng | 174/15.7 |
| 4,661,674 A | * | 4/1987 | Inoue | 219/69.13 |
| 5,317,804 A | * | 6/1994 | Kasper | 29/860 |
| 5,378,870 A | * | 1/1995 | Krupnicki | 219/137.63 |
| 5,527,994 A | * | 6/1996 | Kasper | 174/74 R |

FOREIGN PATENT DOCUMENTS

| | | | |
|---|---|---|---|
| DE | 36 32 722 A1 | * | 3/1988 |
| JP | 03-53491 | * | 3/1991 |

* cited by examiner

*Primary Examiner*—William H. Mayo, III
(74) *Attorney, Agent, or Firm*—Holland & Knight LLP

(57) ABSTRACT

A power cable assembly for use in a water and air-cooled welding assemblies for carrying power from a welding machine to a welding torch and either cooling water from the torch to a circulator reservoir or, in the case of air-cooled torches, shielding gas to the torch. The cable assembly includes a flexible outer conduit disposed about a flexible electrical conductor formed of a plurality of twisted, braided or bunched wires encased in a thin layer of flexible plastic material. A plurality of projections extend radially from the flexible encasement so as to space the electrical conductor from the interior conduit wall, thereby defining a water or gas-flow path extending entirely about the conductor.

12 Claims, 2 Drawing Sheets

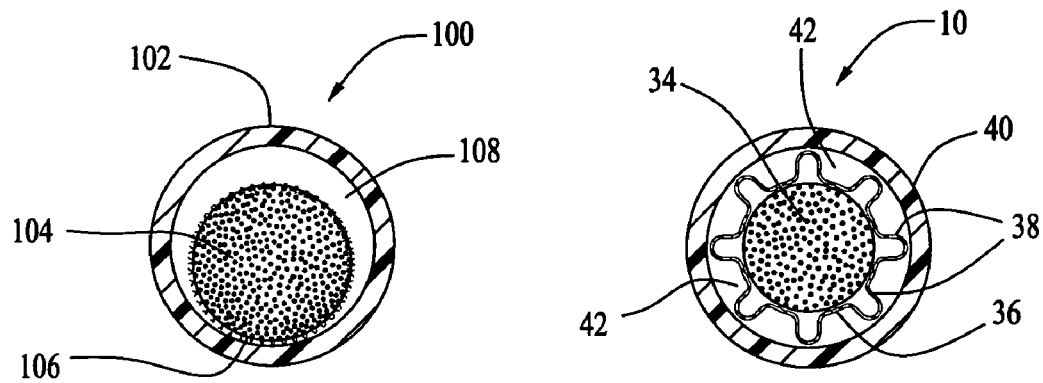
FIG. 2 PRIOR ART
FIG. 3
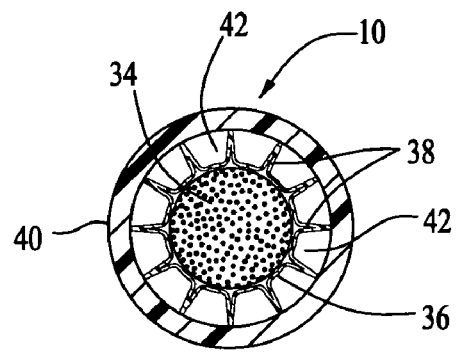
FIG. 4

POWER CABLE ASSEMBLY FOR WATER AND AIR-COOLED WELDING TORCHES

BACKGROUND OF THE INVENTION

Welding torches of the water-cooled type used for TIG (tungsten inert gas), MIG (metallic inert gas) and plasma welding and cutting processes are typically connected to the power source (welding machine) with three or more lines. One line conveys cooling water to the torch head, a second line conveys the shielding gas to the torch head and the third line is used to transfer the electrical output from the power source or welding machine to the torch head. This third line also conveys cooling water back to the circulator reservoir. This third line is commonly referred to as the power cable. With plasma torches, there may be two power cables on each torch. These power cables are made from a flexible plastic tube or rubber hose that defines a conduit. Inside the conduit is a stranded copper cable formed of fine individual wires twisted or braided in a rope-like construction. The copper wires can be bare or plated. The copper cable functions as the electrical conductor for the power cable and is smaller in diameter than the inside bore of the conduit tube or hose so as to allow the cooling water to pass along side the cable, cooling the cable as the water passes thereover and is returned to the reservoir. To avoid any confusion in terminology, the term "cable" or "cable conductor" will be used herein to refer to the above-described current carrying stranded copper cable. The term "power cable assembly", when used herein in connection with water-cooled welding torches refers to the cable and conduit combination which carries electric power to the torch and cooling water from the torch.

The copper cable in the power cable assembly rests on the surface of the inside bore of the conduit and is thus not entirely surrounded by water. This results in a less efficient cooling condition than would exist if the cable were completely surrounded by the flowing cooling water. As power cable assemblies are typically 12.5 to 25 feet in length, a substantial portion of the cable is in contact with the inside surface of the conduit and not with the cooling water. As a result of this relatively inefficient cooling of the cable, the cable must be relatively large in size to maintain the desired level of current capacity. The larger cable also adds bulk and weight to the power cable assembly and the welding torch resulting in less flexibility and added operator fatigue. A smaller cable size could be used if the cable could be more efficiently cooled by the water flowing within the conduit disposed about the cable.

During normal use of these torches, the torch head is continually being moved up and down and from side to side, as well as twisted, as the operator accesses the weld joint. This constant movement causes the fine copper wires of the cable to work harden and fracture. The problem is compounded by the fact that the cooling water passing over the copper causes hydrogen embrittlement. The hydrogen molecules from the water interact with the copper molecules embrittling the copper and causing the fine copper wires to splinter and break off. The wire splinters are carried by the cooling water flow to the end fitting on the power cable assembly where they collect and block the water flow through the fitting and cause overheating and torch failure. The use of other copper wire alloys that are less susceptible to hydrogen embrittlement, such as oxygen-free copper, has not resulted in appreciable improvement. It has been found, however, that when the twisted, braided or bunched copper wires are encapsulated with a thin coating of plastic, the current carrying capacity of the copper cable substantially improves. There is more arc stability at very low current levels and the fraying of the copper cable due to flexing and hydrogen embrittlement is eliminated. It has also been found that by utilizing a thin coating on the nature of about 0.010 of an inch, the coating has minimal insulating effect on the wire cable so as not to adversely impact the effectiveness and efficiency of the cooling water. While the individual copper wires will eventually break and fray due to normal work hardening of the copper, the plastic casing will contain the frayed splinters, preventing blockage at the end fitting. Providing the plastic casing with a suitably sized spline or star profile would tend to center the copper cable within the conduit such that the cooling water will completely surround the cable as it flows through the conduit, cooling the entire surface of the cable and greatly improving the water-cooling efficiency. As a result, a smaller diameter cable conductor can be used, reducing the weight and increasing the flexibility of the power cable assembly.

In air-cooled torch assemblies, the power cable again provides a dual function. Instead of conveying the cooling water back from the torch head to the circulator reservoir, the power cable used with air-cooled torches conveys an inert shielding gas such as argon to the torch head about the stranded cooper cable. Thus, when used herein in connection with air-cooled welding torches, the term "power cable assembly" refers to the cable and conduit combination which carries electric power and gas to the torch.

As the inert shielding gas in an air-cooled welding torch assembly flows from the supply tank through the power cable and out the end of the torch nozzle, the gas picks up heat from the copper cable, cooling the cable. While this cooling of the electrical cable by the flowing gas is not as efficient as the cooling effected by the flowing water in water-cooled torches, it does have a cooling effect. As with the water-cooled torches, the efficiency of this cooling effect is adversely affected by the contact between the cable and the inside bore of the outer tube or hose which prevents the gas from completely surrounding the cable as it flows thereby. Thus, the use of a thin plastic casing about the copper cable with a suitably sized spline or star profile to center the cable within the conduit will also improve the cooling efficiency of the electrical cable in air-cooled welding torch assemblies.

In addition to providing improved cooling in both water and air-cooled torches, the use of such a casing about the copper cable adds additional electrical insulation about the cable, inhibiting the grounding of the cable during use. High frequency current ("HF") is often used to initiate and sometimes stabilize the welding arc. HF current travels on the surface of the copper cable and is prone to leak or go to ground anywhere along the cable as the cable lays on the floor or workbench. By centering the copper cable in the outer tube or hose of the power cable assembly, the tendency of the HF current to penetrate the outer tube or hose and go to ground would be further diminished in both water and air-cooled applications. Thus, the result of the present invention is a substantially improved power cable for use with both water and air-cooled TIG, MIG and plasma torches.

SUMMARY OF THE INVENTION

Briefly, the present invention comprises a power cable assembly for water and air-cooled TIG, MIG and plasma torches. In water-cooled torch applications, the cable assembly is comprised of a flexible outer tube or hose for carrying cooling water from the torch head back to the circulator reservoir, a copper cable of a smaller diameter disposed within the conduit for electrically communicating the torch head with the welding machine and a thin coating of a flexible plastic material encapsulating the copper cable. The coating reduces fraying of the wire cable due to flexing and hydrogen embrittlement and contains any wire splinters that may break off during use to prevent clogging of any water passageways or connector fittings. The plastic coating also defines a plurality of radial projections extending therefrom so as to abut the interior wall of the outer conduit so as to position the cable within the conduit such that the water passing therethrough flows completely about the copper cable, cooling the entire surface of the cable, significantly enhancing the water cooling efficiency. In air-cooled torch applications, the plastic coating and radial projections position the cable within the conduit such that the gas passing therethrough completely surrounds the cable to enhance the cooling of the cable. In both water and air applications, additional electrical insulation is provided in addition to the centering of the electrical cable within the conduit to inhibit grounding.

BRIEF DESCRIPTION OF THE DRAWINGS

FIG. 2 is a cross-section of a power cable assembly of the type employed in the prior art.

FIG. 3 is a sectional end view of a first embodiment of the power cable assembly of the present invention.

FIG. 4 is a sectional end view of a second embodiment of the power cable assembly of the present invention.

DETAILED DESCRIPTION OF THE PREFERRED EMBODIMENT

Figure 1:
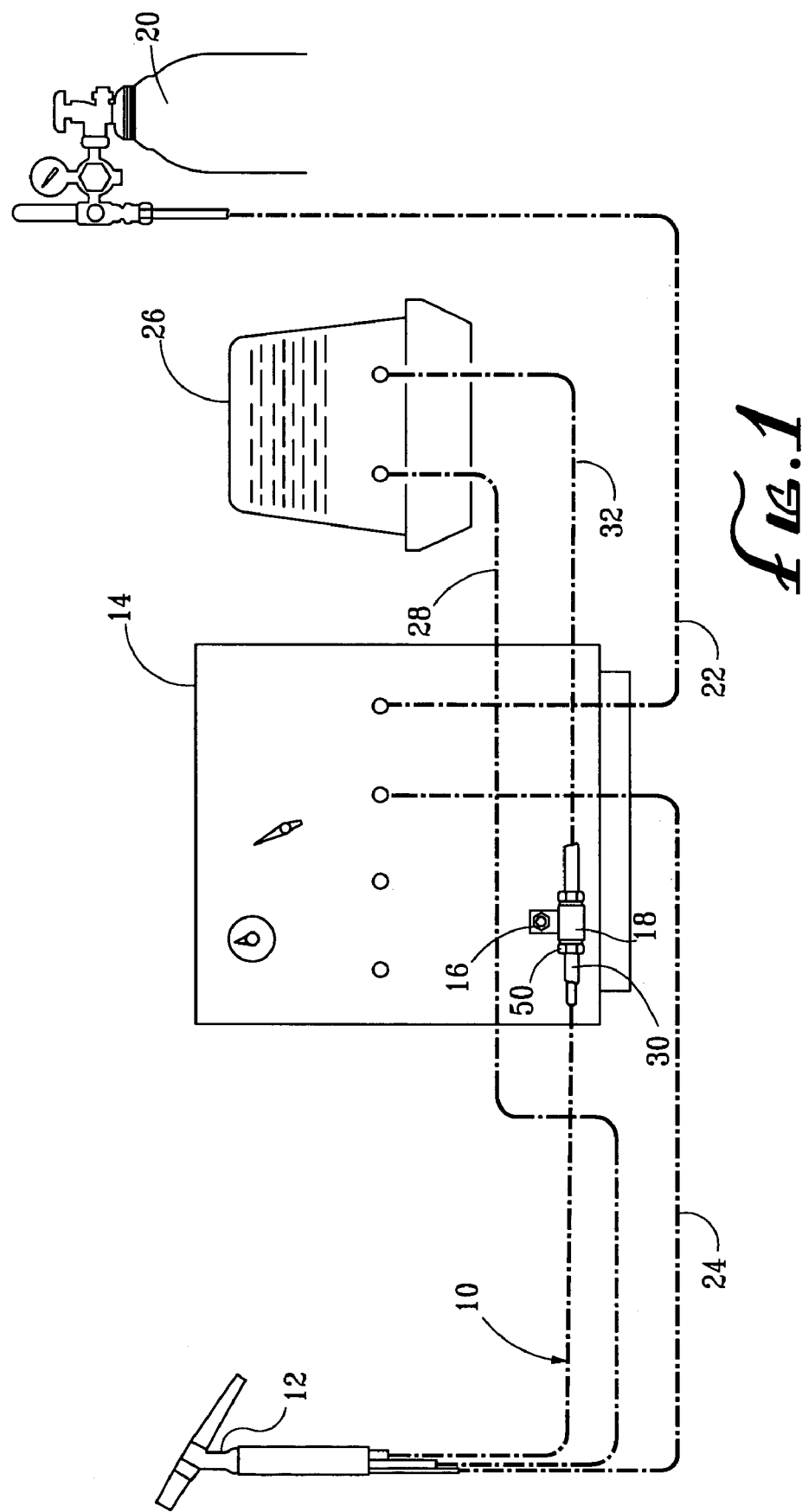
FIG. 1 is a schematic representation of a water-cooled TIG welding apparatus.

Referring now in detail to the drawings, a typical power cable application in a water-cooled TIG welding assembly is illustrated in FIG. 1. As seen therein, the power cable assembly 10, to which the present invention is directed, extends between and electrically communicates the welding torch 12 with the welding machine 14 by virtue of the direct connection between the power cable assembly and an output stud 16 on the welding machine through an electrically conductive adapter 18. The inert tungsten gas is provided to the torch 12 from gas supply 20 through lines 22 and 24 via the welding machine 14. Cooling water is provided to the torch from the circulator reservoir 26 via line 28. The water is returned to the reservoir 26 through the power cable assembly 10, a flow-through conduit portion 30 of adapter 18 and fluid-flow return line 32. As the water flows through the power cable assembly 10, it cools the electrically conductive cable disposed therein.

A cross-section of a typical power cable assembly 100 of the type employed in the prior art is illustrated in FIG. 2. As seen therein, the power cable assembly comprises an outer flexible plastic tube or rubber hose 102 disposed about an electrically conductive cable 104 formed of a plurality of bare or plated copper wires tightly wound into a rope-like pattern. Conventional end fittings (not shown), constructed of an electrically conductive material, are provided on the opposed ends of the power cable assembly 100 for securing the cable assembly 100 to a welding torch at one end and the adapter on a welding machine at the other end. As illustrated in FIG. 2, the cable 104 rests against the interior surface of tube or hose 102 so as to define a surface contact area 106 and a water-flow channel 108. As seen in FIG. 2, the creation of the surface contact area 106 by reason of the conductive cable 104 resting against the interior surface of the tube or hose 102 prevents the water flow channel 108 from extending entirely about the outer surface of the cable 104, reducing the efficiency of the cooling effect provided by the water. As a result of the relatively inefficient cooling, the cable 104 must be relatively large in diameter, typically about 0.300 inches in diameter, which not only increases the cost of materials for power cable assembly 100 but adds significant bulk and weight to the power cable assembly and the welding torch, resulting in reduced flexibility and added operator fatigue.

As illustrated in FIGS. 3 and 4, the power cable assembly 10 of the present invention differs from cable assembly 100 of the prior art in that the conductive cable 34 is of a reduced diameter, typically about 0.150–0.200 inches, and is encased in a thin coating 36 of a flexible plastic material, such as polyvinyl chloride (pvc). Coating 36 has a thickness of only about 0.008–0.015 of a inch to avoid insulating the conductive cable 34 from the cooling effects of the water flow through the power cable assembly 10. Projecting from coating 36 are a plurality of radial projections 38, preferably integrally formed with coating 36. Projections 38 extend outwardly from coating 36 terminating proximate the interior surface of the flexible tube or rubber hose 40 of the power cable assembly 10 so as to space the conductive cable 34 away from the interior surface of tube or hose 40, and preferably to position the cable in substantial axial alignment with the central axis of the outer tube or hose 40. As a result, the water-flow channel 42 within the power cable 10 completely surrounds the copper cable 34 such that the water flowing therethrough will cool the entire surface of the cable, substantially enhancing the cooling efficiency of the water and allowing for the use of a reduced diameter cable 34 within power cable assembly 10 as compared to the cable 104 in the prior art cable assembly 100. The centering of the cable within the outer tube or hose 40 also inhibits grounding of the power cable as it lies on the floor or work bench. The encasement of the wound wires comprising cable 34 not only provides additional electrical insulation to further inhibit grounding but also prevents any frayed wire splinters from being carried along with the water flow and occluding the water passageway and/or blocking the downstream end fitting 50 on power cable assembly 10, thereby significantly enhancing the life of the power cable assembly.

The power cable assembly 10 of the present invention used in air-cooled torch applications is of the same configuration as described above except for the end fittings thereon and the fact that the water-flow channel 42 functions as a conduit for the inert gas flowing from the gas supply 20 to the torch 12. Otherwise, the power cable assembly employed in air-cooled applications is the same as that employed in water-cooled torch applications. In both applications, the power cable assembly transmits electrical power through a centrally disposed electrically conductive cable and a flow of fluid (water or gas) about the cable.

Two embodiments of the power cable assembly 10 of the present invention are illustrated in FIGS. 3 and 4. The difference in the two embodiments is the configuration of the radial projections 38 formed by the plastic casing 36 to center the electric cable 34 within the outer tube or hose 40. FIG. 3 illustrates a spline configuration, whereas FIG. 4 illustrates a star-like configuration. Other radially projecting patterns could, of course, be defined by casing 36 to space the electric cable 34 from the wall of the tube or hose 40. These and various other changes and modifications may be made in carrying out the present invention without departing from the spirit and scope thereof. Insofar as these changes and modifications are within the purview of the appended claims, they are to be considered as part of the present invention.

I claim:

1. A power cable assembly for use in a water-cooled welding apparatus for conveying power from a welding machine to a welding torch and cooling water from the torch to a circulator reservoir, said cable assembly comprising:
   a flexible electrical conductor formed of a plurality of twisted, braided or bunched wires;
   a layer of flexible material encasing said conductor so as to isolate said conductor from the cooling water and defining a plurality of projections extending radially therefrom; and
   an outer flexible conduit disposed about said conductor and said encasing layer, said projections spacing said conduit from said conductor and defining a plurality of unobstructed water-flow paths extending therebetween and along said conduit so as to uniformly surround said conductor for the effective dissipation of heat in said conductor.

2. The power cable assembly of claim 1, wherein said layer of flexible material is a plastic material so as to electrically insulate said conductor and has a thickness within the range of about 0.008–0.015 inches for the effective dissipation of heat therethrough.

3. The power cable assembly of claim 1, wherein said radial projections are integrally formed with said layer of flexible material.

4. The power cable assembly of claim 3, wherein said layer of flexible material is a plastic material so as to electrically insulate said conductor and has a thickness within the range of about 0.008–0.015 inches for the effective dissipation of heat therethrough.

5. A power cable assembly for use in a water-cooled welding apparatus for conveying power from a welding machine to a welding torch and cooling water from the torch to a circulatory reservoir, said cable assembly comprising:
   an outer flexible conduit;
   a flexible electrical conductor formed of a plurality of twisted, braided or bunched wires and disposed within said conduit;
   a layer of flexible material encasing said conductor so as to isolate said conductor from the cooling water whereby embrittlement of said wires is inhibited, said encasing layer having a thickness within the range of about 0.008–0.015 inches so as to allow for the effective dissipation of heat therethrough;
   a plurality of projections extending radially from said encasing layer for abutting said flexible conduit and spacing said conductor and said encasing layer from said flexible conduit, said projections defining a plurality of unobstructed water flow paths extending therebetween and along said conduit so as to uniformly surround said conductor for the effective dissipation of heat in said conductor to coolin water flowing through said water flow paths; and
   a pair of end fittings for securing said power cable assembly between the welding torch and welding machine in fluid and electrical communication therewith.

6. The power cable assembly of claim 5, wherein said radial projections are integrally formed with said layer of flexible material encasing said conductor.

7. A power cable assembly for use in an air-cooled welding apparatus for conveying power and inert gas to a welding torch, said cable assembly comprising:
   a flexible electrical conductor formed of a plurality of twisted, braided or bunched wires;
   a layer of flexible material encasing said conductor so as to electrically insulate said conductor and defining a plurality of projections extending radially therefrom; and
   an outer flexible conduit disposed about said conductor and said encasing layer, said projections abutting said conduit so as to uniformly space said conduit from said conductor and define a plurality of unobstructed gas-flow paths extending therebetween and along said conduit so as to uniformly surround said conductor for the effective dissipation of heat in said conductor.

8. The power cable assembly of claim 7, wherein said layer of flexible material is a plastic material having a thickness within the range of about 0.008–0.015 inches for the effective dissipation of heat therethrough.

9. The power cable assembly of claim 7, wherein said radial projections are integrally formed with said layer of flexible material.

10. The power cable assembly of claim 9, wherein said layer of flexible material is a plastic material having a thickness within the range of about 0.008–0.015 inches for the effective dissipation of heat therethrough.

11. A power cable assembly for use in an air-cooled welding apparatus for conveying power and inert gas from a welding machine to a welding torch, said cable assembly comprising:
   an outer flexible conduit;
   a flexible electrical conductor formed of a plurality of twisted, braided or bunched wires and disposed within said conduit;
   a layer of flexible material encasing said conductor so as to electrically insulate said conductor, said encasing layer having a thickness within the range of about 0.008–0.015 inches for the effective transfer of heat therethrough;
   a plurality of projections extending radially from said encasing layer and abutting said flexible conduit, spacing said conductor and said encasing layer from said flexible conduit and defining a plurality of a gas flow paths within said conduit extending therebetween and along said conduit so as to uniformly surround said conductor for the effective dissipation of heat in said conductor; and
   a pair of end fittings for securing said power cable assembly between the welding torch and welding machine in fluid and electrical communication therewith.

12. The power cable assembly of claim 11 wherein said radial projections are integrally formed with said layer of flexible material encasing said conductor.

* * * * *